350-6.9
8/17/82    OR    4,344,666

United States Patent [19]
Birgmeir et al.

[11]  4,344,666
[45]  Aug. 17, 1982

[54] OPTO-MECHANICAL DEVICE TO CONTROL THE DIRECTION OF BEAMS OF VISIBLE LIGHT

[75] Inventors: Klaus Birgmeir, Munich; Klaus Stadler, Irschenhausen, both of Fed. Rep. of Germany

[73] Assignee: Agfa-Gevaert Aktiengesellschaft, Leverkusen, Fed. Rep. of Germany

[21] Appl. No.: 166,252

[22] Filed: Jul. 7, 1980

[30] Foreign Application Priority Data

Jul. 5, 1979 [DE] Fed. Rep. of Germany ....... 2927199

[51] Int. Cl.$^3$ ............................................. G02B 27/17
[52] U.S. Cl. .................................................. 350/6.9
[58] Field of Search ............ 350/6.9, 6.4, 1.5, 6.8, 350/6.14, 6.1, 6.2, 6.3, 6.7; 358/199, 206

[56]  References Cited

U.S. PATENT DOCUMENTS 3,907,197  9/1975  Poschl et al. ................ 350/6.9 X

OTHER PUBLICATIONS

Wyant, "Rotating Diffraction Grating Laser Beam Scanner", Applied Optics, vol. 14, No. 5, May 1975.

Primary Examiner—John K. Corbin
Assistant Examiner—Rebecca D. Gass
Attorney, Agent, or Firm—Michael J. Striker

[57]  ABSTRACT

A rotating optical element can be used to produce a rotating beam of light from a fixed incident light beam. This rotating beam of light is directed into a suitable optical element which focuses the beam in only one direction. By use of the device disclosed herein, a beam of light can be reoriented according to the requirements of the user while preserving resolution ability, deflection frequency, and general applicability of the invention to special-purpose applications.

8 Claims, 13 Drawing Figures

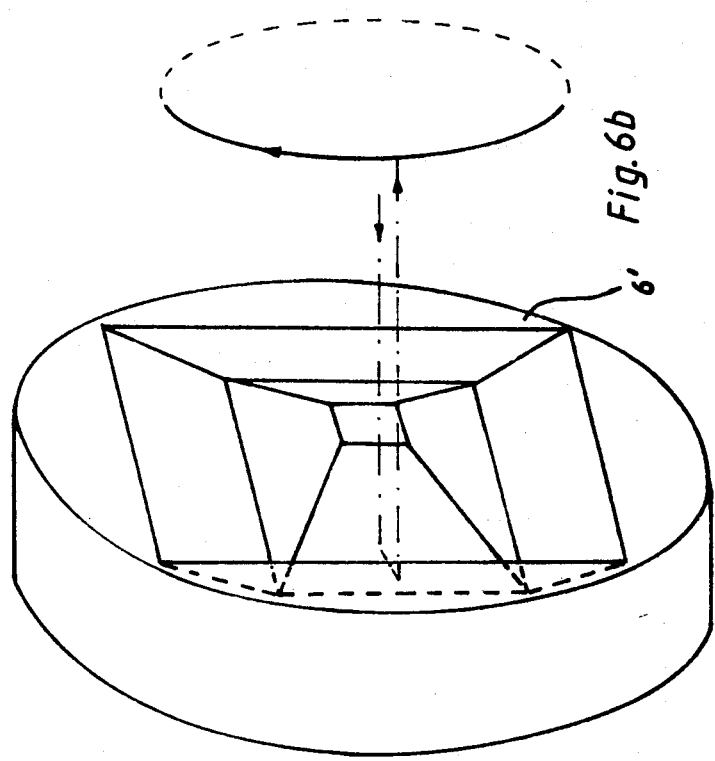
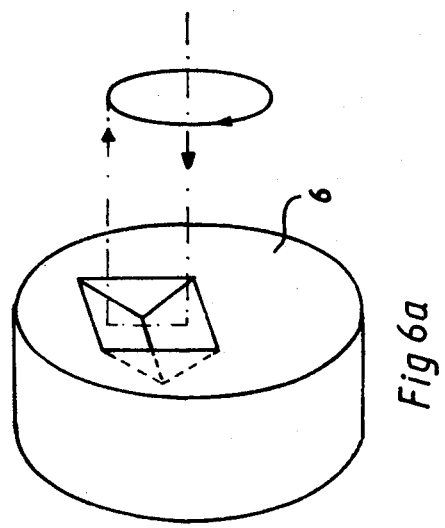

OPTO-MECHANICAL DEVICE TO CONTROL THE DIRECTION OF BEAMS OF VISIBLE LIGHT

BACKGROUND OF THE INVENTION

1. Field of the Invention

The invention pertains to an opto-mechanical device to control the direction of visible beams of light by means of movable optically-functioning components such as movable mirrors, mirror wheels and the like, by which an incident light beam is deflected in a desired direction.

2. Description of the Prior Art

Many different principles and methods are known and in use in order to control the direction of beams of visible light. An overview of the most important methods, along with data pertaining thereto, such as purchase price, deflection angle, optical aperture, resolution ability and deflection frequency is given in Table 1. With the exception of the first three devices, all of the other devices are associated with opto-mechanical beam deflectors. Such opto-mechanical beam deflectors all have the common feature that light beams are deflected directly by a movement of mirrors, prisms, grates and the like in the desired direction. Known devices such as these are very sensitive to disturbances, and are particularly sensitive to mechanical fluctuations of the movable optical components, both in the direction of movement and perpendicular to the axes of their rotation. Such fluctuations lead to corresponding errors in beam deflection. Known apparatus is also ill-suited for special-purpose applications, causing correspondingly high expenditures when such applications are required.

Therefore, it would be advantageous to provide an opto-mechanical device to control the direction of optical beams of light by means of movable optical components which are less sensitive to mechanical disturbances, which are of the simplest possible construction, and which have optimal resolution capability in addition to general usefulness both for ordinary applications and special-purpose applications.

SUMMARY OF THE INVENTION

These objects, among others which will become apparent hereinafter, are achieved in this invention by use of simple and generally useful components which afford a large degree of flexibility in use along with adequate resolving ability and deflecting frequency for the size of the device. It is of importance that the apparatus operates to deflect the beam of light by pure rotational movement of components that have a large inertia, causing only small fluctuations in the direction of rotation to take place. Moreover, because of the unique construction and order of the parts which actually deflect the beam, fluctuations taking place perpendicular to the axes will, in most cases, have little or no effect, making the device practically uninfluenced by mechanical disturbances of this type.

A main feature of the invention is that the necessary use of further optical components which would ordinarily cause scanning errors in the scan points to arise do not appear and thus do not hinder the function of this inventive apparatus. In this invention, the deflection frequency of the beam of light is defined in a sinusoidal fashion.

The novel teachings which are considered as characteristic for the invention are set forth in particular in the appended claims. The invention itself, however, both as to its construction and its method of operation, will be best understood from the following description of specific embodiments when read in connection with the accompanying drawings.

BRIEF DESCRIPTION OF THE DRAWINGS

FIGS. 5a, 5b, 6a, and 6b show variations in the embodiments shown in FIGS. 1 and 2 with which an elevated deflection frequency may be achieved.

DETAILED DESCRIPTION OF PREFERRED EMBODIMENTS

Figure 1:
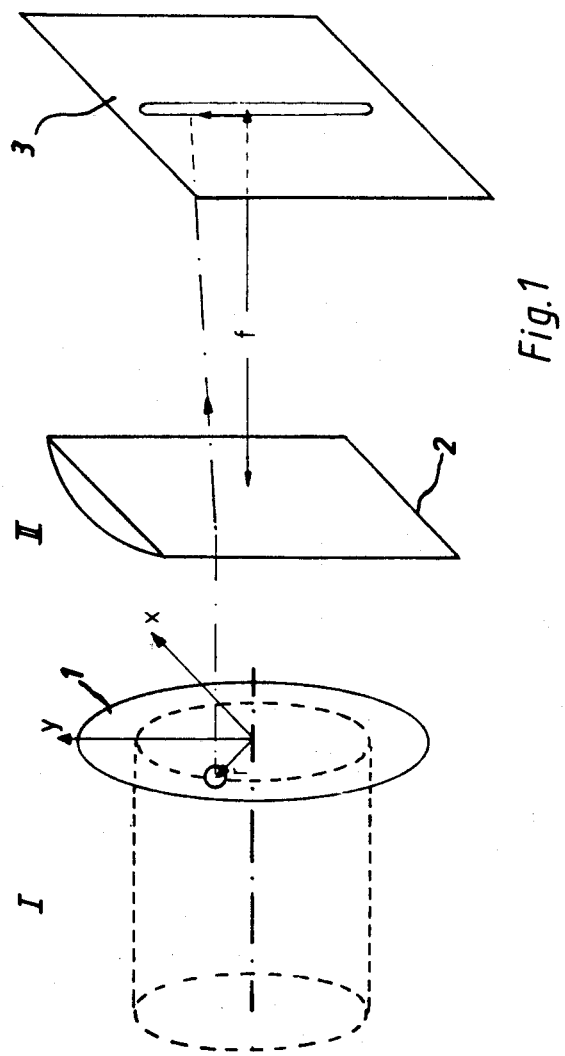
FIG. 1 shows the principle of the invention using a rotating perforated screen with a following cylinder lens.

Referring first to FIG. 1, which shows the principle by which this invention operates, it can be seen that an incident beam of light is incident upon a rotating disc 1, which has a single circular perforation located a distance r from its center. Light passing through the perforation is then directed on a cylinder lens 2, which focuses the light along its focal line and projects it onto a screen 3. It will be apparent to those skilled in the art that the light passing through screen 1 will have x and y coordinates governed by the equation $(x(t),y(t))=(r\cos \omega t, r \sin \omega t)$ where $\omega=2\pi f$ and f equals the frequency of rotation of disc 1, so that the x and y coordinates of the light incident upon screen 3 will be governed by the equation $(x(t),y(t))=(O, r \sin \omega t)$.

By appropriate dimensioning of the parts shown in FIG. 1 in the system there shown, the data set forth in Table 2 can be obtained. The selection of the diameter d of the perforation in disc 1 is selected from the viewpoint of achieving 95% of the best available sharpness of the geometry shown in the first Fresnel zone according to the equation $d=1.9\sqrt{f\lambda}$, where f is the distance between cylinder lens 2 and screen 3 and $\lambda$ is the wavelength of the light. Since the ratio of incident light to light projected on screen 3 is not particularly suitable, the arrangement shown in FIG. 1 is not used in practice.

Figure 2:
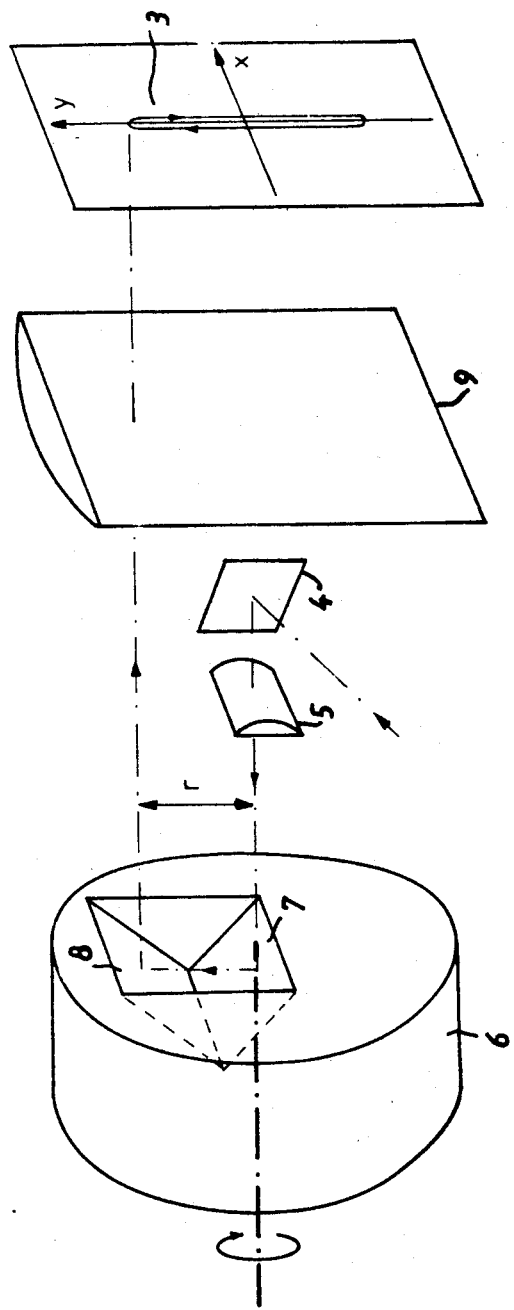
FIG. 2 shows a beam deflection device with a rotating mirror arrangement having two mutually perpendicular mirror surfaces.

In FIG. 2, an incident light beam is first directed onto a plane mirror 4, which reflects the light onto a cylinder lens 5 that focuses the light in the y direction. Light thus focused is directed onto a rotating mirror assembly 6, which rotates in the direction shown in FIG. 2 around an axis that is perpendicular to the flat surface of cylinder lens 5. The rotating mirror assembly 6 supports two plane mirrors 7 and 8 being so oriented that the axis of rotation of mirror assembly 6 passes through the center of plane mirror 7.

Thus, it can be seen that light incident upon plane mirror 4 will eventually be reflected off plane mirror 8 and directed onto cylinder lens 9, which in combination with lens 5 as will be known to those skilled in the art, will focus the light on screen 3 to a focal point, moving along a straight vertical line.

Advantageously, plane mirrors 7 and 8 can be perpendicular to each other, especially when formed by a right-angled roof prism. It can be seen from FIG. 2 that since cylinder lens 5 focuses the incident light in such a fashion that there is a minimal spreading in the y-direction, that the mirror assembly 6 will reflect an incident light beam back onto cylinder lens 9 at a distance r away from the beam incident upon it. Thus, rotation of mirror assembly 6 is not attended by any blockage of the reflected light beam by plane mirror 4 or cylinder lens 5.

In contrast to the apparatus shown in FIG. 1, cylinder lenses 5 and 9 focus the light beam in such a fashion that a relatively large optical aperture can be used. With a practically realizable aperture of 20 millimeters, 25,000 image points per deflection of the beam can be resolved, as long as purely non-diffractive optics are used. Light loss in the deflection apparatus can be neglected.

Figure 3:
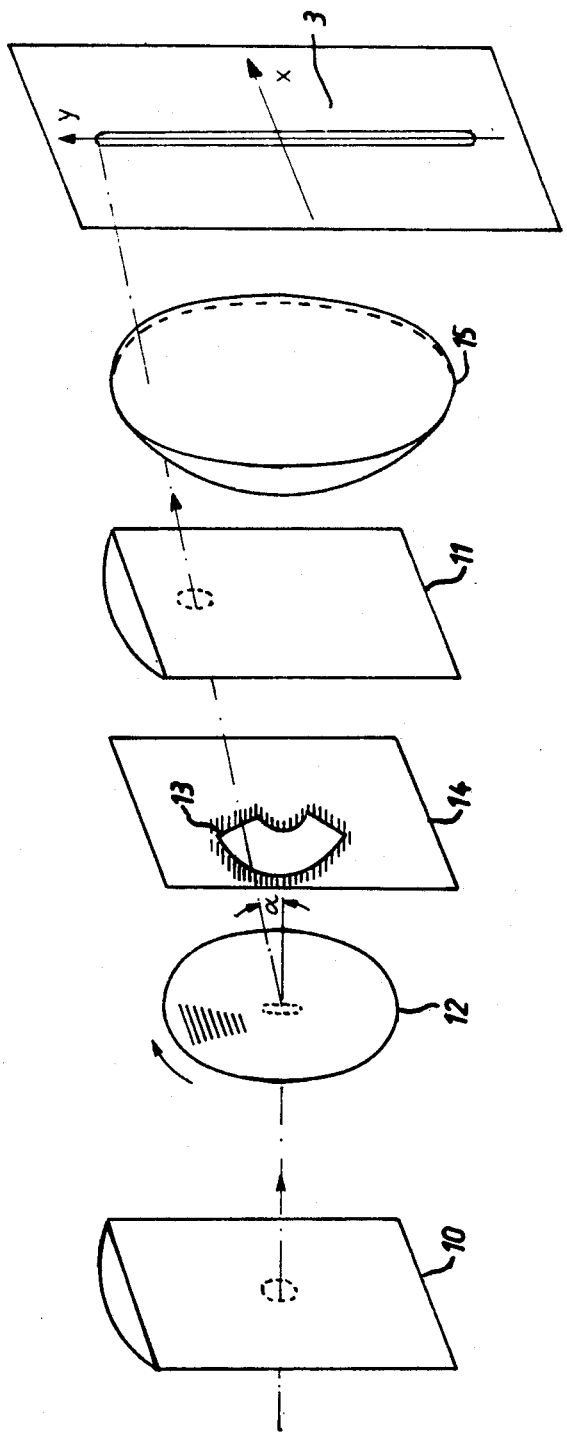
FIG. 3 shows a second embodiment of the invention utilizing a rotating diffraction grating.

In the embodiment shown in FIG. 3, a light beam is incident upon a cylinder lens 10, which focuses the light onto a rotating diffraction grating 12. After passing through diffraction grating 12, the light passes through an arcuate slot 13 in plate 14, to be directed onto cylinder lens 11. After being focused by cylinder lens 11, the light passes through a spherical lens 15, to be finally projected onto screen 3.

The focal lengths of like cylinder lenses 10 and 11 are so chosen that they converge in the region of diffraction grating 12. As light passes through diffraction grating 12 at its center, zero-order rays are undeflected and are thereby blocked by plate 14. However, as diffraction grating 12 rotates, positive and negative first- and higher-order rays are alternately deflected up and down to pass through slot 13 and thereby pass through the rest of the system. Light passing through slot 13 is focused into a beam of light which is of the same diameter as the beam of light passing through slot 13 but is inclined with respect to the y axis by an angle which can be suitably adjusted by proper selection of component dimensions. Spherical lens 15 then focuses light passing through cylinder lens 11 onto a straight vertical line on screen 3. Inasmuch as the angle of deflection through diffraction grating 12 can be varied at will by proper selection its diffraction constant, angles of deflection and paths traversed by light so deflected can be varied within a wide range, so that the embodiment shown in FIG. 3 can have a high resolution capability.

Figure 4:
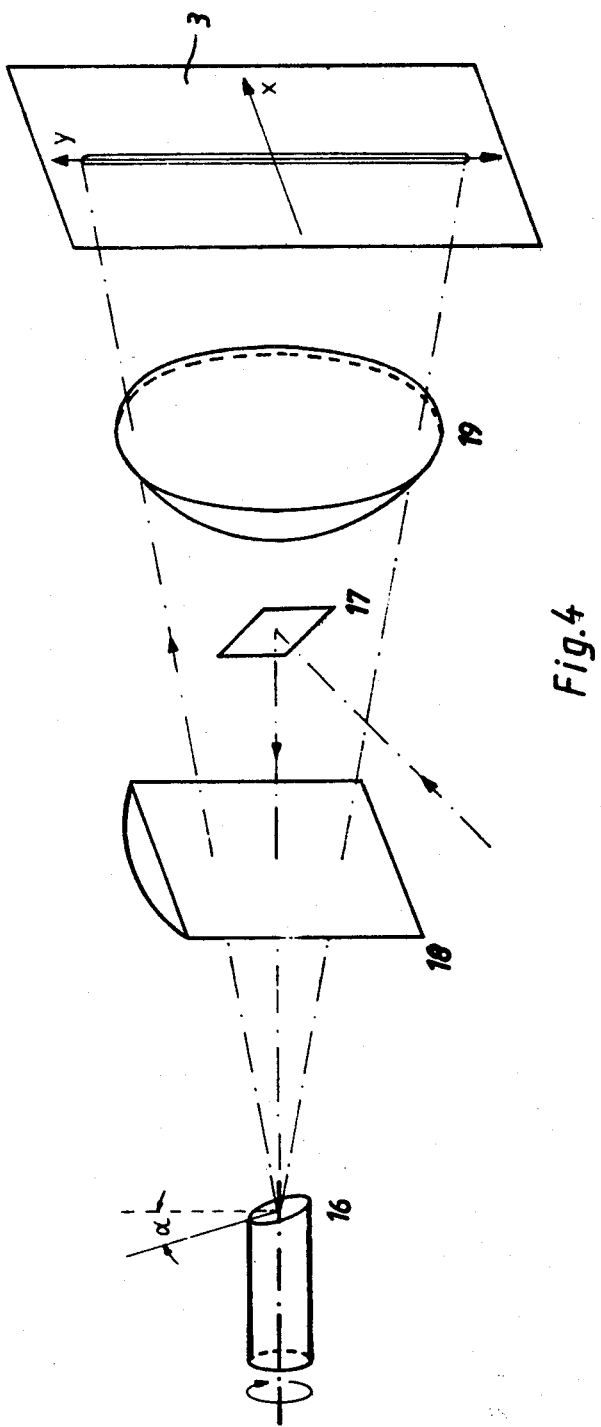
FIG. 4 shows a third embodiment of the invention utilizing a rotating mirror.
Figure 5B:
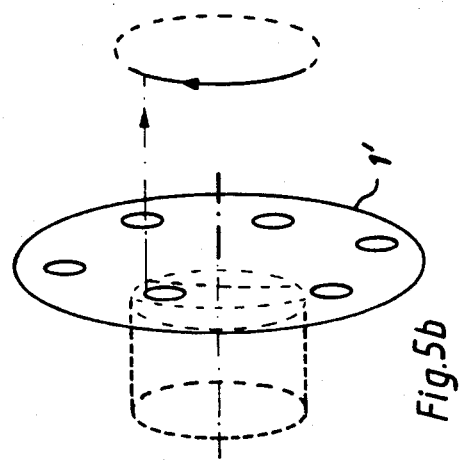
Figure 5A:
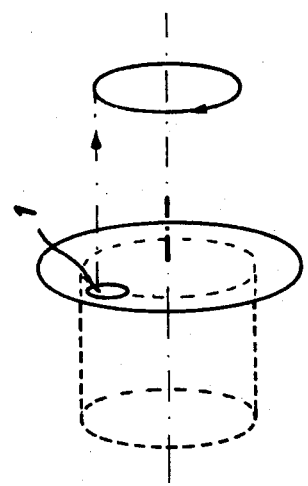

While the embodiment shown in FIG. 3 is only suitable for use with monochromatic light when a diffraction grating or diffraction prism is used, the embodiment shown in FIG. 4 surmounts this disadvantage by utilizing a rotatable plane mirrored surface on a rotating body 16, so that the surface is not perpendicular to its axis of rotation. In the embodiment shown in FIG. 4, an incident light beam is directed onto a plane mirror 17, which directs the light onto the flat surface of a cylinder lens 18, rather than onto the curved surface thereof as in all the previous embodiments. After passing through cylinder lens 18, light is reflected off the mirrored surface on body 16, causing the light to be reflected back towards cylinder lens 18 in the shape of a cone. As before, light passing through cylinder lens 18 can then be passed through spherical lens 19, to be focused in a straight vertical line on screen 3. This embodiment permits the same freedom of selection of the angle of deflection as does the embodiment shown in FIG. 3, which latter embodiment utilizes a diffraction grating.

In the previously described embodiments, the deflection frequency is determined by the rotational speed of the rotatable optical element and, on mechanical grounds, is limited to between 300 and 400 Hz, corresponding to 18,000 to 24,000 revolutions per minute. In the event that a second perforation in the disc shown in FIG. 1 were to be used, the deflection frequency would be doubled. Likewise, if the alternate up-and down deflection of positive and negative first- and higher-order rays in the diffraction grating 12 were to be simultaneously utilized, rather than alternately utilized as in the embodiment shown in FIG. 3, deflection frequency would likewise be doubled.

Figure 7C:
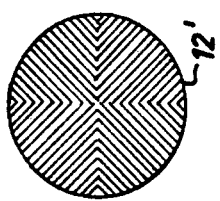
FIGS. 7a, 7b, 8a, and 8b show elaborations of the embodiments shown in FIGS. 3 and 4 which can be used to cause two or more synchronized deflection processes to take place utilizing one common structure.
Figure 7B:
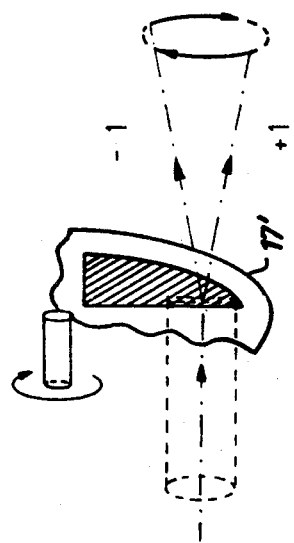
Figure 8B:
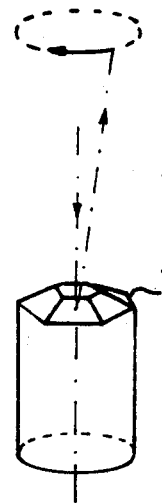
Figure 7A:
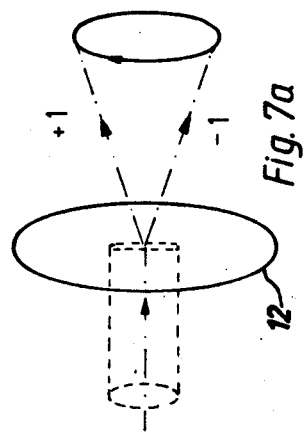
Figure 8A:

In a fashion analagous to the technique of using a rotating mirror, the invention can be used to raise the deflection frequency of a light beam by dividing the entire process into n equivalent sections while simultaneously displacing the axis of rotation. Variants and advantageous alterations of the rotating disc, the right-angle mirror assembly, and the diffraction grating are shown in FIGS. 5a, 5b, 6a, 6b, 7a, 7b, 7c, 8a, and 8b. While the rotating disc 1 shown in FIG. 5a has only one perforation, the rotating disc 1' shown in FIG. 5b has six like perforations which are evenly spaced around the circumference of the disc. Hence, deflection frequency can be increased sixfold. While the roof prism shown in the rotating mirror assembly 6 shown in FIG. 6a has only one pair of reflecting surfaces, the mirror assembly 6' shown in FIG. 6b has a prism which will allow four deflections to take place simultaneously. In FIG. 7a, a single rotating diffraction grating 12 is shown, which alternately deflects positive rays up and negative rays down. With the diffraction grating 12' shown in FIG. 7b, four such deflections can take place simultaneously because diffraction grating 12' is divided into four complementary quadrants in which diametrically opposed quadrants have parallel rulings while adjacent quadrants have mutually perpendicular rulings. Likewise, the rotating body 16 shown in FIG. 8a has only one reflecting surface, while the rotating body 16' shown in FIG. 8b has six surfaces which are of like shape and inclination relative to the axis of rotation and meet together in the center of body 16' in order to form a regular hexagon. Here, 6 separate deflections can take place simultaneously. The other portions of the embodiments of the invention taught herein can be multiplied and used unaltered in parallel with each other when any of the variations shown in these Figures are used.

Table 2 shows how the characteristics of the invention change when the number n of perforations/sections of the rotatable element used in the invention changes.

In some applications for this device two or more synchronized deflection processes are required, such as, for example, a pointwise scanning of an original of a picture and a simultaneous production of a copy. In such cases, a correspondingly modified rotating component can be used such as is provided in the embodiment shown in FIG. 4, in which component both ends of rotating body 16 are equipped with obliquely oriented mirror faces. In the base of the embodiment shown in FIG. 3, a diffraction grating having four segments, such as is shown in FIG. 7c, can be provided so that 3 further beams of light can be each made incident upon a separate cylinder lens and spherical lens in order to enable four synchronous deflection processes to take place simultaneously. This embodiment can be used in connection with a copier so that one of the channels can insure an exact positioning of the beam of light, as is for example the case in reading a picture stored on magnetic tape.

It will be understood that each of the elements described above, or two or more together, may also find a useful application in other types of constructions differing from the types described above.

While the invention has been illustrated and described as embodied in an opto-mechanical device to control the direction of beams of visible light, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

TABLE 1

|  | PRICE IN DM | OPTICAL SCANNING ANGLE | OPTICAL OPENING (DIAMETER) | RESOLUTION CAPABILITY PER SCAN | MAXIMUM SCAN FREQUENCY |
|---|---|---|---|---|---|
| CRT DISPLAY | 10000 | — | — | 5000 | 25 kHz |
| ELECTRO-OPTICAL SCANNER | 10000 | 0.25° | 2 mm | 10 | 100 kHz |
| ACOUSTO-OPTICAL SCANNER | 6000 | 3° | 16 mm | 1000 | — |
| ROTATABLE PRISM | 10000 | 30° | 20 mm | 10000 | 10 kHz |
| STEPPER-MOTOR DRIVEN MIRROR | 2000 | 10° | 20 mm | 400 | 0.5 Hz |
| MOVING COIL GALVANO-METER QUICK RETRACE | 800 | 30° | 1 mm | 400 | 400 Hz |
| MOVING-IRON GALVANO-METER | 1000 | 30° | 7 mm | 4000 | 400 Hz |
| ROTATABLE MIRROR | 100000 | 50° | 10 mm | 20000 | 16 kHz |
| SELF-RESONANT OPTICAL SCANNER | 2000 | 10° | 7 mm | 1000 | 16 kHz |
| HOLOGRAPHIC SCANNER |  | 30° | 3 mm | 3000 | 4 kHz |

TABLE 2

| CHARACTERISTICS OF AN OPTO-MECHANICAL BEAM DEFLECTOR WITH N PERFORATIONS (CONSTRUCTION AND DIMENSIONS PER FIG. 1) | | | |
|---|---|---|---|
| CHARACTERISTIC | MATHEMATICAL DESCRIPTION | 1 (2) PERFORATIONS | 6 PERFORATIONS |
| DEFLECTION ANGLE FOR N PERFORATIONS | $\delta_n = 2\arctg \dfrac{\gamma \sin \frac{\pi}{n}}{f}$ | approx. 30° | approx. 15° |
| DEFRACTION ANGLE | $\dfrac{1}{1.22} \cdot \dfrac{p}{d}$ | $\delta = 0.047°$ for $p = 400$ mm, $d = 0.4$ mm |  |
| THEORETICAL RESOLUTION LIMIT (NUMBER OF POINTS PER DEFLECTION ANGLE) | $m = \dfrac{\alpha n}{\delta}$ | about 500 points | about 250 points |
| DEFLECTION FREQUENCY | $v = \dfrac{n}{60} \cdot \text{rev/min}$ | about 400 Hz (800 Hz) | 2.4 kHz |
| DEFLECTION VELOCITY | $v(t) = v_0 \cos \omega t$ | $\dfrac{\pi}{2} < \omega t < +\dfrac{\pi}{2}$ | fur $-\dfrac{\pi}{6} < \omega t < +\dfrac{\pi}{6}$ ($\triangleq$ 14% max. divergence from $v_o$) |

What is claimed as new and desired to be protected by Letters Patent is set forth in the appended claims:

1. An opto-mechanical device to control the direction of beams of visible light utilizing a movable optical component and adapted to deflect an incident beam of light in a desired direction and comprising a first optical component by which an incident beam of light can be converted into a rotating beam of light, said first optical element including a rotating mirror assembly having at least two mutually perpendicular reflecting mirrors; a relay mirror and a first cylinder lens which focuses in a Y coordinate direction direct the incident beam of light onto the rotating mirror assembly, whereby the rotating beam of light is reflected back towards the relay mirror parallel to the axis of rotation of the mirror assembly; and a second optical element, the produced rotating beam of light being focused in only one direction by the second optical element to be projected in a desired region, both optical elements cooperating with each other in a fashion that the deflected beam of light is focused in the desired region; and the second optical element including a second cylinder lens which focuses in a X-coordinate direction and is located after the rotating mirror assembly.

2. The opto-mechanical device defined by claim 1, wherein the axis of rotation of the rotating mirror assembly passes through the center of one of the reflecting surfaces located therein.

3. The opto-mechanical device defined by claims 1 or 2, wherein both of the mutually perpendicular reflecting surfaces are formed by surfaces in a right-angled roof prism.

4. An opto-mechanical device to control the direction of beams of visible light utilizing a movable optical component and adapted to deflect an incident beam of light in a desired direction and comprising two identical and identically oriented cylinder lenses; a rotating diffraction grating, said cylinder lenses being located one behind the other with their focal lines coinciding with the rotating diffraction grating having an appropriately chosen diffraction constant, the incident beam of light after passing through the first of the cylinder lenses having a portion of its light deflected by the rotating diffraction grating to form a rotating beam of light; and a slotted plate and a spherical lens which focuses monochromatic light in the rotating beam of light along an Y-coordinate direction.

5. The opto-mechanical device defined by claim 4, wherein the rotating diffraction grating is manufactured with a certain number of segments and that the device is supplemented with further pairs of cylindrical lenses and spherical lenses, whereby separate channels can be derived to allow synchronous deflection processes to take place simultaneously.

6. The opto-mechanical device defined by claim 5, wherein when the device is used in connection with another device to scan originals to be copied, one of the channels can be used to exactly position the beam of light in order to read a picture stored on a magnetic tape.

7. An opto-mechanical device to control the direction of beams of visible light utilizing a movable optical component and adapted to deflect an incident beam of light in a desired direction and comprising a first optical element by which an incident beam of light can be converted into a rotating beam of light, said first optical element including a rotating mirror having an inclined mirror face; a relay mirror and a cylinder lens which focuses along an Y-coordinate direction direct the incident beam of light onto the inclined mirror face of the rotating mirror, whereby the rotating beam of light is reflected from the inclined mirror face of the rotating mirror back towards the cylinder lens and the relay mirror; and a spherical lens which focuses the rotating beam of light along an Y-coordinate direction.

8. The opto-mechanical device defined by claim 7, wherein the rotating mirror is constructed from a mirror assembly having a plurality of inclined mirror faces, whereby at any given time during rotation of the rotating mirror the incident beam of light is incident on one of the inclined mirror faces and reflected therefrom back towards the relay mirror.

* * * * *